Nov. 9, 1954

R. J. EHRET 2,694,169

ELECTRIC PROPORTIONING CONTROL APPARATUS
WITH AUTOMATIC RESET

Filed May 5, 1950

FIG. 1

INVENTOR.
ROBERT J. EHRET

BY
Arthur H. Swanson
ATTORNEY.

*INVENTOR.*
ROBERT J. EHRET
BY
ATTORNEY.

Nov. 9, 1954

R. J. EHRET 2,694,169

ELECTRIC PROPORTIONING CONTROL APPARATUS WITH AUTOMATIC RESET

Filed May 5, 1950

*INVENTOR.*
ROBERT J. EHRET

BY

ATTORNEY.

*INVENTOR.*
ROBERT J. EHRET
BY
ATTORNEY.

United States Patent Office 2,694,169
Patented Nov. 9, 1954

2,694,169

ELECTRIC PROPORTIONING CONTROL APPARATUS WITH AUTOMATIC RESET

Robert J. Ehret, Philadelphia, Pa., assignor to Minneapolis-Honeywell Regulator Company, Minneapolis, Minn., a corporation of Delaware Application May 5, 1950, Serial No. 160,158

20 Claims. (Cl. 318—29)

The general object of the present invention is to provide improved measuring and control apparatus for electrically effecting proportional control with automatic reset action. More specifically stated, the general object of the invention is to provide a novel and effective combination of electrical means for automatically or manually effecting proportional control of a variable quantity such as a temperature, with electrical means for automatically modifying the proportional control action by reset action. The modified control action thus produced is dependent upon the direction and magnitude of the departure of the controlled variable from a normal or set-point value of the latter, and upon the duration of the period during which the departure has continued.

A specific object of the invention is the inclusion of a novel thermal device or heat bridge in a reset device so that the reset action is produced and regulated by the heating action of regulated electric heating currents passed through heating elements thermally associated with temperature responsive resistors which decrease in resistance in a predetermined manner as their temperatures are increased.

A still more specific object of the invention is to provide a novel structural assemblage comprising two temperature responsive resistors and a heating element arranged in such manner that one resistor will heat up more rapidly than the other even though the two temperature responsive resistors are so formed as to have similar resistances when at the same temperature, and are so arranged that in each prolonged reset action, both resistors will ultimately attain the same maximum temperature.

Other and more specific objects of the invention are to provide simple and effective means for varying the reset rate; to provide simple and effective means for regulating and varying the maximum reset obtainable with the apparatus; and to provide simple and effective means for regulating the proportional band of the proportional control action, i. e. the extent of adjustment of the fuel valve or analogous control element produced by a given change in the controlled variable quantity.

The invention is primarily characterized by the use of separate electrical bridge circuits energized by alternating current for respectively producing a proportional control voltage signal depending in magnitude and direction on the departure of the controlled variable from its normal or set-point value, and a control voltage signal varying in a predetermined manner with the magnitude, direction and duration of the departure of the controlled variable from its normal set-point value, and for combining the two signals to produce a control effect dependent on the algebraic sum of the two signals.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Figure 1:
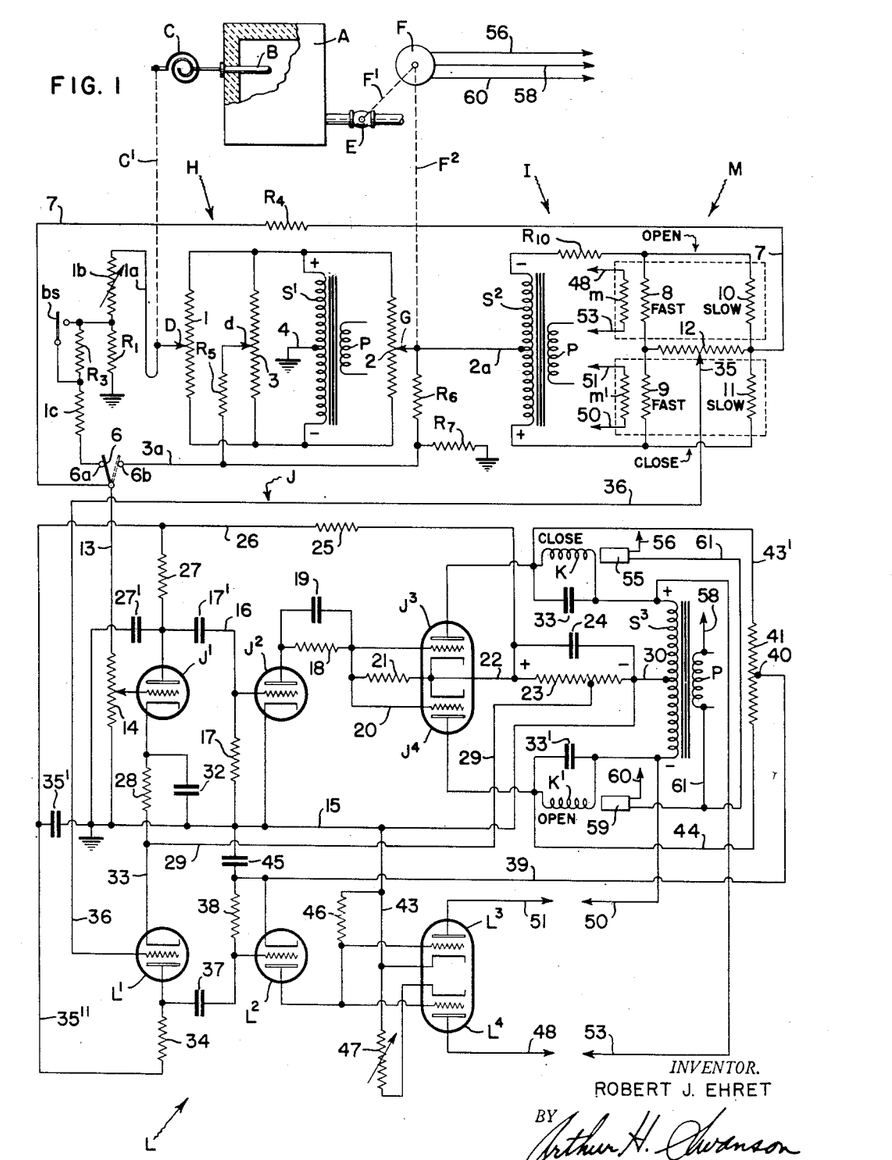
Fig. 1 is a diagram illustrating a desirable embodiment of the present invention.

In Fig. 1 of the accompanying drawings, I have diagrammatically illustrated a desirable embodiment of the present invention in a form designed, by way of example, for use in controlling the supply of fluid fuel to a furnace A, as required to maintain a predetermined, or set-point, furnace temperature. The fluid pressure developed in a thermometer bulb B inserted in the furnace, provides a measure of the furnace temperature and actuates a motor device C in accordance with variations in said temperature. As shown the device C is a spiral capillary tube which adjusts a slider contact D, through an operating connection C', up and down along a slide wire resistor 1 included in a proportional or follow-up bridge circuit H as the furnace temperature increases and decreases. The supply of fuel to the furnace A is regulated by adjustments of a fuel valve E which are effected by the operation of a reversible electric valve motor F adjusting the valve through an operating connection $F^1$. As the motor F adjusts the valve E, it acts through a second operating connection $F^2$ to effect a proportional adjustment of a slider contact G along a second slide wire resistor 2 included in the bridge circuit H.

The circuit H is of a type known as a follow-up bridge circuit, and the resistor 1 is appropriately called an instrument slide wire because its slider contact D is adjusted by a measuring instrument which may take any one of various well known forms, differing from the simple device including the elements B and C shown in Fig. 1. The resistor 2 is properly called a valve slide wire because its associated contact G is adjusted along the resistor 2 in proportion to the extent of the adjustments made to the valve E. The adjustments of the slider contacts D and G along the associated slide wires 1 and 2 operate through the circuit H and associated control apparatus to effect appropriate control operations of the control motor F.

The control apparatus associated with the follow-up bridge circuit H comprises a reset bridge circuit I, an electronic follow-up amplifier J which includes relay windings K and K' directly controlling the operation of the motor F, and an electronic reset amplifier L. The latter operates through a thermal regulator or heat bridge M included in the reset bridge circuit, to regulate the effect of the latter on the operation of the follow-up amplifier J, and to subject the amplifier L to a follow-up action.

The follow-up bridge circuit H includes in addition to the previously mentioned slide wire resistors 1 and 2, a third slide wire resistor 3 and a source of alternating current S'. The resistors 1, 2 and 3 are connected in parallel with one another and across the energizing current source S', which is a secondary winding of an alternating current transformer. The latter has its primary winding P connected across a source of alternating current (not shown), which may be of conventional voltage and frequency, for example, 115 volts and 60 cycles per second. The slide wire 3 is engaged by a slider contact $d$, which may be manually adjusted along the slide wire 3 to manually control the operation of the motor F, during periods in which it is desired to control the operation of the furnace manually instead of automatically. When manual control is to be effected, a movable switch member 6 is adjusted from its position shown in full lines, into its position shown in dotted lines in Fig. 1. In its full line position, the switch member 6 engages a stationary switch contact 6$a$, which is connected to the slider contact D, by a conductor 1$a$ including a variable resistor 1$b$, a fixed resistor 1$c$ and a resistor $R_3$, when the associated short circuiting switch $b_s$ is open. The junction of resistors 1$b$ and $R_3$ is connected by a fixed resistor $R_1$ to ground, as shown. In its dotted line position, the switch member 6 engages a stationary switch contact 6b which is connected by a conductor 3a and a fixed resistor $R_5$ to the manually adjustable slider contact d. The slider contact G is connected at all times to the switch member 6 by a circuit including a conductor 2a, the reset bridge circuit I, a conductor 7, and a resistor $R_4$.

The reset bridge circuit I comprises the secondary windings $S^2$ of a transformer having a primary winding P. In practice, the secondary windings $S'$ and $S^2$, and the hereinafter mentioned winding $S^3$, may be different secondary windings of a single energizing transformer which has only one primary winding P. While the precise voltages induced in the secondary windings $S'$, $S^2$, and $S^3$ are not critical, it is noted that in the particular apparatus design shown, the output voltages of the windings $S'$, $S^2$, and $S^3$ are 12.6 volts, 40 volts and 550 volts, respectively. The thermal device or heat bridge M associated with the reset bridge circuit I, includes a pair of thermally responsive resistors 8 and 9 which are connected in series with one another and a resistor $R_{10}$ across the terminals of the winding $S^2$, and a second pair of thermally responsive resistors 10 and 11 connected in series with one another and in parallel with the series connected resistors 8 and 9. One terminal of the winding $S^2$ is connected through resistor $R_{10}$ to one end terminal of each of the resistors 8 and 10, and the second end terminal of the winding $S^2$ is directly connected to one end of each of the resistors 9 and 11. A center-tap connection on the winding $S^2$ is connected to the conductor 2a. The conductor 7 connects the switch member 6 to the connected ends of the resistors 10 and 11. The connected ends of the resistors 8 and 9 are also connected to the connected ends of the resistors 10 and 11 by a slide wire or potentiometer resistor 12, the resistance of which may be one megohm. As is hereinafter explained, the resistor 12 serves a reset rate control purpose.

Figure 3:
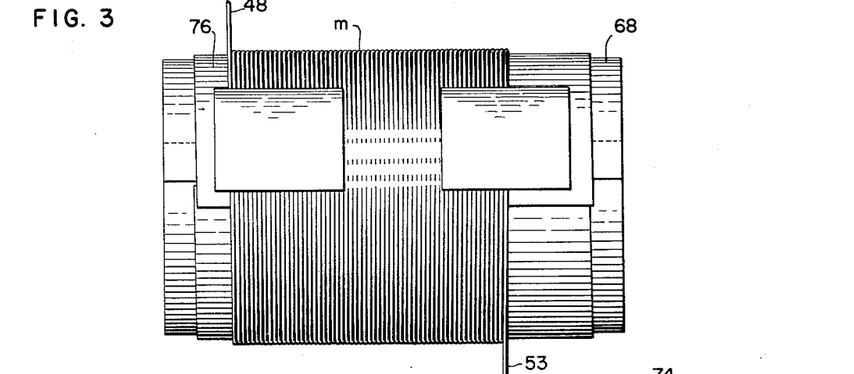
Fig. 3 is an enlarged side elevation of a thermal unit comprising two temperature responsive resistors and a heating resistor.
Figure 4:
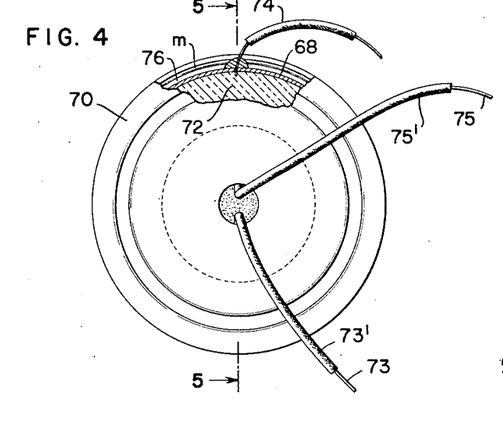
Fig. 4 is an end elevation of the unit shown in Fig. 3.
Figure 5:
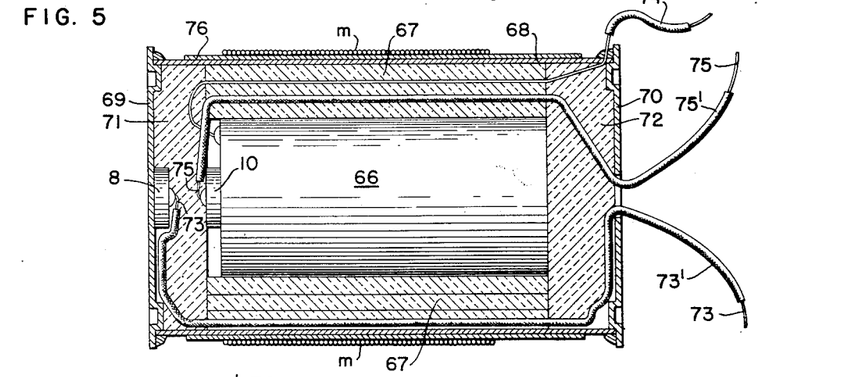
Fig. 5 is a section on the line 5—5 of Fig. 4.

Each of the resistors 8, 9, 10 and 11 has a negative temperature coefficient, and is subject to temperature regulation. The temperatures of the resistors 8 and 10 are controlled by the heating effect of current flow through a heating resistor m, and the temperatures of the resistors 9 and 11 are controlled by the heating effect of current flow through a heating resistor $m'$. As is diagrammatically indicated by their relative arrangements shown in Fig. 1, a change in the current flowing through the heating element m produces a relative rapid change in the temperature and resistance of the resistor 8 which is called a "fast" resistor, and a substantially slower change in the temperature and resistance of the resistor 10 which is called a "slow" resistor. Similarly, a change in the current flowing through the heating resistor $m'$ produces a relatively rapid change in the temperature and resistance of the "fast" resistor 9, and a relatively slow change in the temperature and resistance of the "slow" resistor 11. The temperature sensitive and heating resistors are so arranged that when the reset operation is suitably prolonged, the "fast" and "slow" resistors ultimately attain substantially the same temperature. As is hereinafter explained, the currents flowing through the resistors m and $m'$ are directly regulated by the reset amplifier L. A preferred practical form of a reset bridge circuit unit including a "slow" resistor, a "fast" resistor, and their common heating resistor is illustrated in Figs. 3, 4 and 5 and hereinafter described.

As will be apparent, when the switch 6 is in its full line position in which it is operative to effect automatic control the instrument bridge H has three output terminals, namely the terminal 1a through which the instrument slider contact D is connected to the switch 6 and thereby to one input terminal 13 of the proportional amplifier J, a terminal 4 connected through a common ground connection to the other and grounded input terminal of the amplifier J, and the terminal 2a through which the slide wire 2 is connected to the reset bridge circuit I. As above mentioned, the terminal 1a includes the variable resistor 1b and fixed resistors $R_3$ and 1c. When the switch 6 is shifted into its dotted line position, the fourth output terminal 3a of the bridge H is substituted for the output terminal 1a in the connection between the bridge circuit H and the amplifier J. As shown, the terminal 3a includes the resistor $R_5$ connected to the slider contact d and a resistor $R_6$ connected to the slider contact G.

The reset bridge I has two output conductors, namely the output conductor 7 including the resistor $R_4$ and through which the control voltage developed in the bridge circuit I is transmitted to the circuit junction at which the switch 6 and conductor 7 are both connected to the input terminal 13 of the amplifier J. The second output terminal 36 of the bridge circuit I connects a slider contact 35 engaging the potentiometer resistor 12 to the input circuit of the reset amplifier L.

Prior to specific explanations hereinafter made concerning the circuit elements through which the electronic amplifiers J and L cooperate to actuate the control motor F in joint response to control signals developed in the bridge circuits H and I, a general summary of the operation of the apparatus disclosed in common in Fig. 1 and in the simplified showing of the invention in Fig. 2, may facilitate an understanding of the invention and its preferred mode of use. Except for the omission from Fig. 2 of the elements A, B, C, E, K and $K'$ shown in Fig. 1, and the omission from Fig. 1 of the proportional band switch BS of Fig. 2, most of what is shown in Fig. 2, finds an equivalent in Fig. 1.

Figure 2:
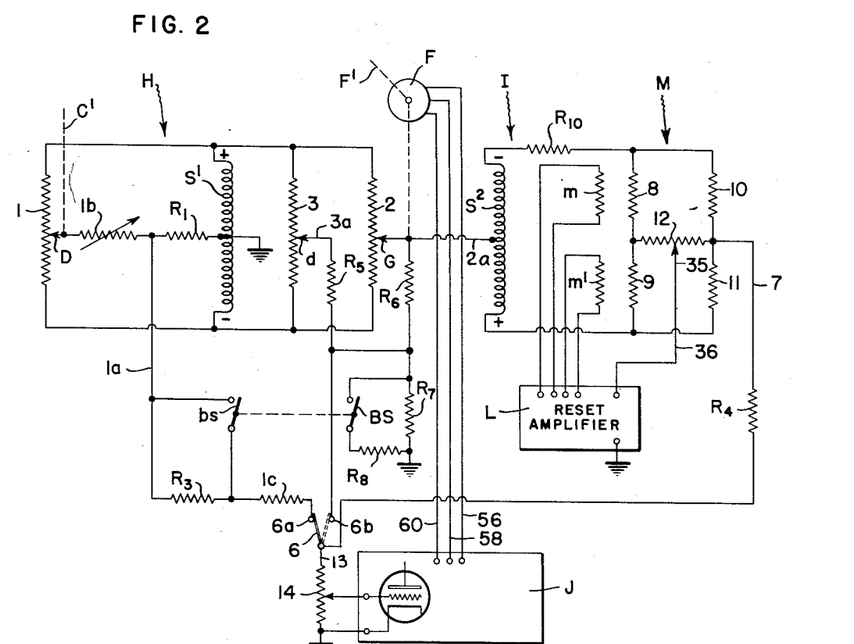
Fig. 2 is a simplified schematic diagram illustrating characteristic features of the invention illustrated in Fig. 1.

As a matter of nomenclature, it is convenient in some cases, and not inaccurate, to regard the circuit networks shown in Fig. 1 and Fig. 2, as comprising the two bridge circuits, namely the follow-up and reset bridge circuits hereinbefore referred to. It may also be convenient in some cases, and not inaccurate, to consider the instrument slide wire 1 and winding $S'$ as forming one bridge circuit, and the winding $S'$ and valve or regulator slide wire 2 as forming another bridge circuit. It may also be convenient in some cases to regard the winding $S^2$ and the temperature responsive resistors 8 and 9, as forming one bridge circuit, and the winding $S^2$ and temperature responsive resistors 10 and 11 as forming another bridge circuit. It is also accurate, and sometimes convenient, to regard the four temperature responsive elements 8, 9, 10, and 11, as constituting separate arms of a Wheatstone bridge, the energizing circuit of which includes the transformer secondary winding $S^2$, and the conjugate or output circuit of which includes the potentiometer resistor 12.

In Fig. 2, the instrument bridge voltage developed across the resistor $R_1$, and the portion of the voltage between the slide wire contact G and ground are connected in series with the network, which comprises the resistors 1c, $R_3$, $R_4$ and the reset bridge circuit I. The input terminal 13 of the proportional or follow-up amplifier J is connected to the resistors 1c and $R_4$ and the other and grounded input terminal of the amplifier J is connected to the grounded center tap of the transformer primary winding $S'$.

In consequence of the voltage division caused by current flow through the last mentioned network, a signal voltage is applied between the input conductor 13 and the grounded input terminal of the proportional or follow-up amplifier J, whenever the difference between the voltage across resistor $R_1$ and the sum of the voltage drops across resistors 1c and $R_3$ is not equal to zero, and also whenever the algebraic sum of the voltage between slidewire contact G and ground, the voltage between conductors 2a and 7, and the voltage drop across resistor $R_4$, is not equal to zero. Such equality of opposing control voltages exists when both of the contacts D and G are in their normal or set-point positions and the voltage between conductors 2a and 7 is zero, and may also occur when the two slider contacts D and G are displaced in opposite directions from their respective normal or set-point positions. When a resultant signal voltage is applied to the input terminals of the amplifier J, the motor F operates in a direction depending on the phase of said signal voltage.

In the fully balanced condition of the apparatus, the instrument slide wire contact D is in its "set" or control point position, which is the mid point of the slidewire 1, the valve slide wire contact G is in its mid, or control point position, the follow-up bridge H is balanced, there is no need for any reset signal, and the reset bridge circuit I is balanced and produces no reset output signal between the conductors 2a and 7. Also in said fully balanced condition, each of the two output signals of the bridge H has zero value, the follow-up amplifier J does not tend to cause rotation of the motor F and the reset amplifier L will supply equal currents to the two heaters m and $m'$ and has no tendency to maintain the reset bridge in an unbalanced condition.

When thereafter a change in load condition occurs, such that the existing position of the fuel valve or analogous final control element is no longer that required for the maintenance of the controlled variable at its set-point value, control actions are effected which move the final control element toward the position required to restore and maintain balance under the new load condition. Thus, for example, in a control arrangement of the character shown in Fig. 1, an increase in the furnace load results in a reduction in furnace temperature and a resultant downward movement of the contact D along the slide wire 1 which unbalances the follow-up bridge H. The change of position of the contact D results in a bridge output signal transmitted through the output terminal 1a to the input of the proportional or follow-up amplifier J. This will result in an operation of the valve motor F giving an initial opening adjustment to the fuel valve, and a proportional adjustment to the valve slide wire contact G in the upward direction. The adjustment of the contact G creates an output signal voltage then transmitted through the reset bridge and its output terminal 7 to the input of the amplifier J. The signal thus transmitted in series through the bridge terminals 2a and 7 is equal in magnitude, but opposite in direction or phase to the signal transmitted to the amplifier J by the terminal 1a, which produced the said motor operation. When the fuel valve and contact G have been moved to their new positions, the net or resultant input signal to the amplifier J will again become equal to zero and the operation of the motor F will temporarily cease with the bridge H in its newly balanced condition.

In the absence of a further load change, said initial adjustment operation of the motor F might well be effective to maintain the existing furnace temperature indefinitely, but for the reset action of the apparatus which results from the initial adjustment of the follow-up contact G. As those skilled in the art will understand, but for its reset provisions, the apparatus disclosed would give regulation "with a drooping characteristic," i. e. regulation in which the controlled temperature varies inversely with the furnace load to a substantial extent. The general purpose and effect of effective reset provisions are to reduce the variations in temperature produced by changes in furnace load. For proportional action, the reset bridge circuit I acts like a fixed resistance, since its balance changes slowly compared to proportional control. Reset action results from a change in balance of the resistance elements included in the reset bridge circuit I, produced by the selective heating action of the heating resistors $m$ and $m'$ under control of the reset amplifier L.

The initial adjustment of the slider contact G away from its mid position along the slidewire 2 following an operative period in which the measuring apparatus is fully balanced, results in the transmission of a signal from the contact G through the reset bridge circuit I to the reset amplifier L. Specifically, the change in potential between the contact G and ground creates a potential difference between the terminals of the potentiometer resistance 12 and ground. In consequence, a signal is then transmitted from the slider contact 35, engaging the resistor 12, through the conductor 36 to the input circuit of the amplifier L. That signal resulting from an opening adjustment of the fuel valve causes the amplifier L to produce a current flow through the heating resistor $m$ associated with the fast and slow resistors 8 and 10, respectively, of the heat bridge M. The heating action of the resistor $m$ creates a resultant voltage signal in the reset bridge circuit I which is transmitted to the amplifier J through the output conductor 7 along with the signal from the contact G. The actual signal current flowing through the conductor 7 is the algebraic sum or resultant of two opposing signal currents.

Figure 6:
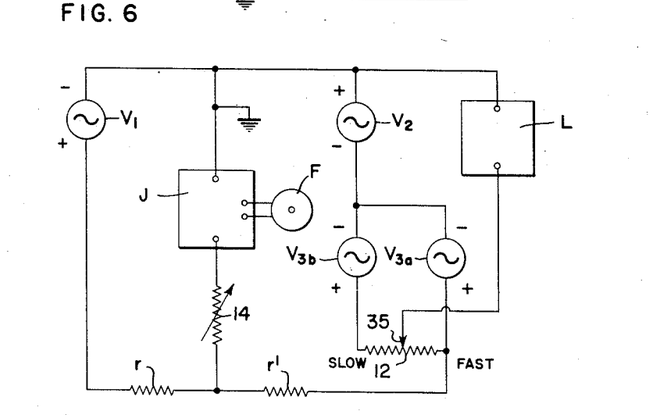
Fig. 6 is a diagram illustrating the relative arrangement and sources of the voltages in the apparatus illustrated in Figs. 1 and 2, which are developed to effect and cooperate in effecting the control actions.

The phase relations of the signal voltages controlling the signal impressed on the input circuit of the amplifier J are indicated diagrammatically in Fig. 6, wherein $V_1$ represents the alternating current signal voltage developed in the Fig. 2 circuit across resistor $R_1$; $V_2$ represents the alternating voltage between the point G and ground; $V_{3a}$ represents the alternating voltage between the conductors $2a$ and 7; and $V_{3b}$ represents the alternating voltage between the conductor $2a$ and the junction of the thermally sensitive resistors 8 and 9. In Fig. 6, the plus and minus symbols indicate simultaneous polarities or phases of the four voltages. As shown in Fig. 6, the four voltages $V_1$, $V_2$, $V_{3a}$, and $V_{3b}$ are applied at separate points of a closed circuit across which the follow-up amplifier J is connected in parallel with the voltage $V_1$ and a resistance $r$ in series with that voltage, and in parallel with the series connected voltages $V_2$ and $V_{3a}$ and resistance $r'$. The resistor $r$ represents the resistors $1c$ and $R_3$ of Fig. 2 and the resistor $r'$ represents the resistor $R_4$. The voltage $V_{3b}$ is connected in series with resistor 12 across voltage $V_{3a}$.

In Fig. 6, the reset amplifier is connected between the contact 35 in engagement with the resistor 12 and the grounded junction of the voltages $V_1$ and $V_2$. The resistance $r'$ serves as an isolating resistance to prevent the voltage $V_1$ from affecting the reset amplifier L. More importantly, the resistor $r'$ in conjunction with the resistor $r$ serves to determine the relative magnitudes of the voltages $V_1$ and $V_2$ required for zero input signal to the amplifier J, and hence, the extent of movement of the contact G along slidewire resistor 2 for a given movement of contact D along slidewire resistor 1. The ratio of $r$ and $r'$ therefore determines the proportional band of the control apparatus.

The relative arrangement of the voltage sources and amplifier J in Fig. 6 is such that the voltage $V_2$ acts on the amplifier J in a direction opposite to that in which each of the other voltages acts on said amplifier. The signal voltage action on the amplifier J is thus the resultant of the three voltages $V_1$, $V_2$ and $V_{3a}$.

On the assumption that the control apparatus has been stabilized with the voltages $V_1$ and $V_2$ equal to zero, immediately following the initial adjustment of the contact G along the valve slidewire 2, the opposing voltages $V_1$ and $V_2$ are of the same magnitude, and the voltage $V_{3a}$ is then zero. However the transmission to the reset amplifier of a signal through the contact 35 and conductor 36 initiates the development of the voltage $V_{3a}$ in the heat bridge M. Initially, that voltage is much smaller than the other voltages. The apparatus is so designed that under ordinary operating conditions the voltage $V_{3a}$ will progressively increase as the "fast" resistor, and the "slow" resistor associated with the heating resistor $m$ progressively heat up at their respective heating rates. The rate of increase of voltage $V_{3a}$, and hence the reset rate, is determined by the position of contact 35 along resistor 12. Eventually, in normal operation and assuming no load change in the meantime, the voltage $V_{3a}$ will progressively increase until it becomes at least approximately as great as the opposing voltage $V_2$.

During the periods in which the voltage $V_{3a}$ is building up the resultant of the three voltages $V_1$, $V_2$ and $V_{3a}$ impressed on the amplifier J causes the motor F to make a relatively slow progressive reset adjustment of the fuel valve in the opening direction for the case under consideration. Normally, a gradual return of the furnace temperature to its normal or set point value is produced by the progressive opening adjustment of the fuel valve by the motor F. As the furnace temperature thus increases, the value of the voltage $V_1$, and the rate at which the reset action effects an opening movement of the fuel valve, are reduced. With control apparatus properly designed and calibrated, and operating under normal conditions, the resultant of the voltages $V_2$ and $V_{3a}$, and the voltage $V_1$ will each attenuate to zero at approximately the same time, so that the motor F will finally come to rest with the fuel valve in the position required to maintain approximately normal temperature at the new load or other operating condition.

For the reset amplifier L to continue its energization of the reset heating resistors $m$ and $m'$ for the new load or other operating condition, ordinarily a signal voltage must be applied to the input terminals of that amplifier. Accordingly, for this condition the resultant of the voltages $V_2$ and $V_{3a}$ must be a finite value which, in practice, may be very small. In order that the motor F may be stationary under this condition, it is necessary that a voltage be applied to the input of the follow-up amplifier J from the source $V_1$ which is equal and opposite to the effect of said finite voltage derived from the voltages $V_2$ and $V_{3a}$. Consequently, a small displacement of the contact D from its set point position along the slidewire resistor 1 is required. In practice, however, under steady load conditions the maximum departure of the contact D from its set-point position and the furnace temperature from its set-point value at the end of each rebalancing operation is very small, and with the sensitivity of the reset portion of the apparatus greater than the sensitivity of the follow-up portion as is practically feasible and usually desirable, and as a result of the existence of a so called dead zone, each reset operation may leave the controlled variable, assumed herein to be the furnace temperature, at an indefinite point in the small dead zone.

In the foregoing explanation, the ideal condition has been assumed in which a period of steady operation follows and precedes an abrupt change in the furnace load and in which each of said steady operation periods is sufficiently prolonged to insure the attainment therein of substantially full balance under the existing load. In practice, operating conditions may be such that changes in the controlled variable occur practically continuously, or at least occur with sufficient frequency and during periods of such length that full balance is not obtained during any such period. Under such conditions, the reset provisions may not exactly return the furnace temperature or other controlled variable to its set point value, but operate nevertheless to desirably reduce the average departure of the controlled variable from its normal value. The precise extent of departure of the controlled variable from its normal value at any instant depends upon the past history of its operating conditions and upon other variables in the process under control.

Proportional band adjustments of the apparatus, obtained only with the switch 6 adjusted to its full line or automatic control position, are effected by adjustment of the potentiometer resistance 1b, and by the adjustment of the switches bs and BS. The proportional band increases as the resistance of the resistor 1b is increased or as the resistance of the circuit between conductor 1a and switch terminal 6a is increased. The adjustment of the switch bs to short circuit the resistor R3 provides a coarse adjustment of the proportional band, while adjustment of the resistor 1b provides a fine adjustment.

As those skilled in the art will understand, adjustment of the switch bs to effect a large variation in the proportional band will result in a change in the overall sensitivity of the follow-up portions of the apparatus from the desirable optimum operating conditions. Specifically, such change may in some cases tend to produce undesirable cycling or hunting of the valve motor F and in other cases tend to undesirably increase the dead zone of the follow-up apparatus. Optimum operating conditions of the follow-up portion of the apparatus may be restored by suitable adjustment of the sensitivity of the amplifier J which may be accomplished by changing the position of the sliding contact along a resistor 14 in the input of the amplifier J.

When the switch 6 is adjusted into its dotted line position, automatic control in response to the variation in the controlled variable and the resultant adjustment of the slider contact D is not effected. However, while the adjustment of the contact d along the slidewire 3 effected with the switch 6 in its dotted line position, is manual, the reset bridge circuit I with its thermal device M, and the reset amplifier L are still operatively connected in the circuit network. In consequence, the mechanism shown in Figs. 1 and 2 will automatically reset to a control or set-point, which is the point along the slidewire 3 to which the contact d has been moved.

As shown, the contact d and the valve slidewire contact G are connected by series connected resistors R5 and R6 of equal resistance. When the contact d is adjusted along the slidewire 3, the proportional amplifier J energizes the valve motor F as required to effect the adjustment of contact G needed to make the voltage across each of the resistors R5 and R6 equal in magnitude, but opposite in phase.

For the purpose of insuring that the follow-up portion of the apparatus will have the same sensitivity, for a given setting of the amplifier sensitivity adjusting resistor 14, in its manual control condition of operation as in its automatic control condition, the input circuit of the amplifier is adapted to be shunted by loading resistors R7 and R8 when the switch 6 is adjusted to its manual control position. The resistor R7 is continuously connected in the circuit, but the resistor R8 is only connected into the circuit when the switch BS is in its closed position. The switch BS conveniently is ganged to the switch bs so that upon adjustment of the apparatus from its automatic to its manual condition of operation and vice-versa, no change will be effected in the sensitivity of the follow-up portion of the apparatus, irrespective of the proportioning band adjustment of the apparatus.

With the control arrangement shown, the injurious consequences of apparatus failures may be largely eliminated or made relatively small. Thus the relays K and K' shown in Fig. 1, and hereinafter described may be interlocked and wired so that if both pull in, due to failure of the voltage amplifier valves J' and J², the regulator or valve E will either be left in its existing position or driven to its closed position. When the reset voltage amplifier fails, the valve E resets to its 50 per cent open position. If one section of the twin valves J³ and J⁴, and L³ and L⁴ fails, the other section is still operative. When this happens, the proportional or reset action will continue to function properly in one direction only.

Upon open circuiting of the contact D, the apparatus will operate as it would if the contact D were at the control or set point and the valve E will then remain in or move to its reset position. Open circuiting at any point from contact G through bridge circuit I to the switch 6 will result in on-off control of the apparatus about the set point. Ordinarily a dirty slidewire 2 will cause the valve motor F to cycle about the position which it would occupy if the wire were clean, and the cycling movements of the slider contact G will clean the wire.

Since the instrument and valve slidewires 1 and 2, are energized directly across the winding S', the value of their resistances will not materially affect the proportional band calibration. This allows the use of resistance values of 100, 135, and 1000 ohms for the resistor 1, and of resistance values of 50, 100, and 135 ohms for the valve slide wire resistor 2, interchangeably.

The electronic amplifiers J and L each includes a plurality of electronic valves which may be of known type. Each of the amplifiers includes some novel features and is associated in a novel manner with other elements of the control apparatus disclosed as will appear from the following description.

The follow-up amplifier J comprises four electronic valves J', J², J³, and J⁴, all of which are energized by the previously mentioned secondary winding S³. Each of the valves J'—J⁴ is shown as a triode, and each of the valves J³ and J⁴ forms a separate half of a twin valve which may well be of the commercially available 12AU7 type. As diagrammatically shown in Fig. 1, each of the valves J' and J² comprises an individual tube, but the valves J' and J² may well be the separate halves of a twin valve of the commercially available 12AX7 type. As shown, the valves J' and J² form a two stage voltage amplifier for amplifying a control signal transmitted from the slider contact D or d through the movable switch member 6 and the conductor 13 constituting an input terminal of the amplifier J. As diagrammatically shown in Fig. 1, the slider contact D is connected to the switch 6 by the output terminal 1a of the proportional or follow-up bridge circuit H. The terminal 1a includes the variable, proportional band regulating, resistor 1b, which may have a maximum resistance of 5000 ohms, and includes the fixed resistor R3 which may have a value of 120,000 ohms, and the fixed resistor 1c which may have a resistance of 33,000 ohms. The switch 6 is connected to ground through the series connected conductor 13, slidewire resistor 14 and grounding conductor 15.

The control grid of the valve J' is connected to the slider contact engaging, and adjustable along, the resistor 14. The latter, as previously noted, serves as a sensitivity regulator for the amplifier J, and may have a resistance of one megohm. The energizing voltage impressed on the output circuit of each of the valves J' and J² is the voltage drop in a resistor 23 which is included in a common portion of the output circuits of the valves J³ and J⁴. The positive end of the resistor 23 is connected through a resistor 25, conductor 26, and a second resistor 27 to the anode of the valve J'. The cathode of the valve J' is connected by a resistor 28 and through a conductor 29 to a tap on the resistor 23. The anode of the valve J' is connected to ground through a condenser 27'. The resistance of the portion of the resistor 23 between the points at which the conductors 15 and 29 are connected to said resistor may be 120 ohms. The resistance of the portion of the resistor 23 between the points at which that resistor is connected to the conductors 29 and 22 may be 10,000 ohms. The anode of the valve J² is connected to the positive end of the resistor 23 through a resistor 18 and a condenser 19 in parallel therewith, and a conductor 20, a resistor 21 and a conductor 22. The cathode of the valve J² is connected to the negative end of the resistor 23 through the grounding conductor 15.

The input circuit of the valve J' may be traced from the control grid of valve J', through the portion of the resistor 14 connecting said grid to the grounding conductor 15, conductor 15, the portion of the resistor 23 connected between conductors 15 and 29, conductor 29, and resistor 28 to the cathode of the valve J'. The cathode of the valve J' is also connected to conductor 15 through a condenser 32. The input circuit of the valve J² consists essentially of a resistor 17 through which the control grid of the valve J² is connected to the conductor 15, and thereby to the cathode of the valve J². The control grid of the valve J² is connected to the anode of the valve J' through a conductor 16 and a condenser 17'.

The cathodes of the valves J³ and J⁴ are each connected to the previously mentioned conductor 22, and the previously mentioned conductor 20 is connected to the control grids of each of the valves J³ and J⁴. The output circuit of the valve J³ includes the cathode of that valve; conductor 22; resistor 23; a condenser 24 in parallel therewith; a conductor 30, connecting said cathode to the mid-point of the winding S³ the upper half of that winding; relay winding K, through which the upper end of the winding S³ is connected to the anode of the valve J³; and a condenser 33 connected in parallel with the winding K. The output circuit of valve J⁴ includes the cathode of that valve, the conductor 22, resistor 23 and parallel condenser 24, conductor 30, the lower half of the winding S³, relay winding K' which connects the lower end of the winding S³, to the anode of the valve J⁴, and a condenser 33' in parallel with the winding K'.

The reset amplifier L comprises four electronic valves, L', L², L³, and L⁴, and is much like the follow-up amplifier J. Thus, as shown, each of the valves L'—L⁴ is a triode, and each of the valves L³ and L⁴ forms a separate half of a twin valve which may well be of the commercially available 12AU7 type. As diagrammatically shown in Fig. 1, each of the valves L' and L² comprises an individual tube, but these two valves may well be the separate halves of a twin valve of the commercially available 12AX7 type.

The anode circuit of the reset amplifier valve L' is energized by the voltage developed across the resistor 23, and its output circuit may be traced from the anode of the valve L' through a resistor 34, a conductor 35", conductor 26, resistor 25, resistor 23, conductor 29, and a conductor 33 to the cathode of the valve L'. The input circuit of the valve L' comprises the cathode of the valve, conductor 33, conductor 29, a portion of resistor 23, grounding conductor 15, the grounded center-tap 4 of winding S', winding S', resistor 2, contact G, reset bridge circuit I and, conductor 36 to the control grid of the valve L'. A condenser 35' connects the conductor 35 to ground.

The output circuit of the valve L² comprises the anode of the valve, a resistor 46, conductor 43, conductor 15, conductor 30, separate connections between the conductor 30 and the two end terminals of a resistor 41 which is connected in a manner to be described, the center-tap 40 of resistor 41, and a conductor 39 connecting the center-tap 40 to the cathode of the valve L². The connection between the conductor 30 and the upper end terminal of the resistor 41 includes the upper half of the secondary winding S³, relay coil K, condenser 33 in parallel therewith, and a conductor 43'. The connection between the conductor 30 and the lower terminal of the resistor 41 includes the lower half of the winding S³, relay winding K', condenser 33' in parallel therewith, and a conductor 44. The control grid of the valve L² is connected to the anode of the valve L' by a condenser 37, and is connected to the cathode of the valve L² and to the conductor 39 by a resistor 38. A condenser 45 connects the conductor 39 to the grounding conductor 15.

The control grids of the valves L³ and L⁴ are directly connected to the anode of the valve L², and are connected through the resistor 46 and the conductor 43 to the grounding conductor 15. The cathode of the valve L³ is connected to ground and to the control grid of that valve through the resistor 46. The cathode of the valve L⁴ is connected to ground through a variable resistor 47, and is connected to the control grid of that valve through the resistors 47 and 46. The resistor 46 may have a resistance of 2.7 megohms. The resistor 47 is a variable resistor which may have a maximum resistance of 20,000 ohms, and serves to limit the maximum reset obtainable with the apparatus.

The anode of the valve L³ is connected by a conductor 51 to one end terminal of the previously mentioned heating resistor m'. The second end terminal of the heating resistor m' is connected through a conductor 50 to the lower end terminal of the secondary winding S³, and is connected through the lower half of the winding S³ and the series connected conductors 30, 15, and 43 to the cathode of the valve L³. The anode of the valve L⁴ is connected by a conductor 48 to one terminal of the heating resistor m, and the second terminal of that resistor is connected by the conductor 53 to the upper terminal of the secondary winding S³ and through the upper half of the winding S³ and the series connected conductors 30, 15, and 43 and the variable resistor 47 to the cathode of the valve L⁴.

In the preferred form of the temperature responsive resistors and associated heating means included in the rest bridge circuit, the "fast" temperature responsive resistor 8, the "slow" temperature responsive resistor 10, and the heating resistor m form one thermal unit which is illustrated in Figs. 3, 4, and 5. The "fast" resistor 9, "slow" resistor 11, and the heating resistor m' form a second unit which need not be illustrated, as it may be identical in form and structure to the first mentioned unit of Figs. 3, 4, and 5.

The thermal unit shown in Figs. 3, 4, and 5 comprises a copper rod 66 to one side of which the slow temperature responsive resistor 10 is soldered. A sheet of glass wool or analogous heat and electrical insulation material 67 is spirally wound about the rod. The copper rod 66, with the insulating layer 67 wound about it is inserted in a cylindrical copper receptacle or "can" 68. The ends of the cylinder 68 are closed by copper end discs or heads 69 and 70, soldered to the ends of the cylinder. The fast temperature responsive resistor 8 is soldered to the inner side of the end disc 69. A mass of glass wool 71 or analogous insulating material is interposed between the disc 69 and the adjacent end of the rod 66 and insulation material 67 wound about the rod 66. A similar insulation mass 72 is interposed between the disc 70 and the adjacent ends of the rod 66 and insulation layer 67.

A terminal conductor 73 soldered to the inner side of the fast resistor 8, and electrically insulated from the can 68, passes along the inner side of the latter to and through the insulation mass 72 and then out of the can 68 through its end wall 70. The second terminal of the fast element 8 is formed by the metallic can 68. A terminal 74 soldered to the can 68 and also to the end of the rod 66 extends longitudinally of the thermal unit between adjacent inner and outer convolutions of the insulation material 67 into and through the insulating mass of material 72. A terminal 75 soldered to the end of the resistor 10 remote from the rod 66, similarly passes to and between adjacent convolutions of the insulating material 67 and the insulation mass 72 through the disc 70. As shown, the portions of the terminals 73 and 75 passing through the insulating material 72 in proximity to the copper rod 66 and then passing through the disc 70 are surrounded by electrical insulation tubes 73' and 75', respectively.

The outer cylindrical wall of the receptacle 68 is surrounded by electrical insulation material 76 on which the heating resistor m is wound with its terminals 48 and 53 extending away from the unit. Each of the heating resistors m and m' may consist of fine wire and have a resistance of 17,000 ohms. The resistance of the individual resistor elements 8, 9, 10, and 11, when at a temperature of 100° F., may well be of the order of 30,000 to 50,000 ohms, and may diminish to an operative minimum of the order of 1000 ohms, when heated to a temperature of 265° F.

The resistor $R_{10}$ may have a value of 100 ohms and insures that the current flow through the temperature responsive resistors 8, 9, 10, and 11, will not be great enough to cause excessive heating of those resistors.

A practically important feature of the invention is the enclosure of each pair of associated "fast" and "slow" resistors, 8 and 10, or 9 and 11, in a single can in the manner illustrated in Figs. 3, 4, and 5, so that the only significant temperature difference between the two temperature responsive resistors in the can, is that due to the greater thermal inertia of the "slow" resistor as a result of the relatively low heat transfer coefficient between the heating resistor and "slow" resistor in the can and the heat storage capacity of the copper rod 66 in the can. The inclusion of associated fast and slow temperature sensitive resistors 8 and 10, or 9 and 11, along with the associated heating resistor m or m', in the same metallic can or unit receptacle, is of much practical importance and contributes directly and materially to the excellent overall performance and operative results obtained with the measuring and control apparatus disclosed herein. With the resistors of the unit enclosed in the same can or metallic receptacle, the unit is made immune to thermal gradients which have been found to be practically objectionable in apparatus heretofore proposed, including fast and slow resistors for use in obtaining reset action.

As diagrammatically shown in Fig. 1, the energization of the motor F for operation in the direction giving a closing adjustment to the fuel valve E upon an increase from the set point in the measured temperature is effected through a switch mechanism 55 actuated by the energization of the relay coil K to close one energizing circuit for the motor F. That circuit, as shown, comprises the switch mechanism 55 and conductors 56, 58, and 61. Specifically, energization of the relay coil K, connects the conductor 56 through the switch mechanism 55 and conductor 61 to the lower energizing conductor of the transformer primary winding P associated with the secondary winding $S^3$. Conductor 58 connects the other energizing conductor of the winding P to the motor F. Accordingly, closure of the switch mechanism 55 connects the motor F across the winding P for operation of the motor in the valve-closing direction.

Similarly, when the relay coil K' is energized, a switch mechanism 59, which may be exactly like the mechanism 55, connects a motor conductor 60 to the conductor 61 and thereby closes a second energizing circuit for the motor F which causes the motor F to operate in the direction required to give an opening adjustment to the valve E. Signal lamps, not shown, may be employed if desired, to indicate the direction of rotation of the motor F.

The values of most of the circuit elements shown in Fig. 1 are not critical, and it is believed that those skilled in the art will not require more information than that hereinbefore given them to enable them to make full use of the invention. However, it is noted that in the successful practical embodiment of the invention illustrated diagrammatically herein, resistors and capacitors shown in Fig. 1 have values as follows:

Resistance of resistor 1b is 0–5000 ohms
Resistance of resistor 1c is 33,000 ohms
Resistance of resistor $R_3$ is 0.12 megohm
Resistance of resistor 12 is 1 megohm
Resistance of resistor 14 is 1 megohm
Resistance of resistor 17 is 10 megohms
Resistance of resistor 18 is 1.2 megohms
Resistance of resistor 21 is 1 megohm
Resistance of resistor 23 is 10.120 ohms
Resistance of resistor 25 is 10,000 ohms
Resistance of resistor 27 is 0.47 megohm
Resistance of resistor 28 is 1000 ohms
Resistance of resistor 34 is 1 megohm
Resistance of resistor 38 is 2.7 megohms
Resistance of resistor 46 is 2.7 megohms
Resistance of resistor 47 is 0–20,000 ohms
Resistance of resistor $R_5$ is 4,700 ohms
Resistance of resistor $R_6$ is 4,700 ohms
The capacity of capacitor 17' is 0.002 mfd.
The capacity of capacitor 19 is 0.01 mfd.
The capacity of capacitor 24 is 20 mfd.
The capacity of capacitor 27' is 0.006 mfd.
The capacity of capacitor 32 is 20 mfd.
The capacity of capacitor 33 is 5 mfd.
The capacity of capacitor 33' is 5 mfd.
The capacity of capacitor 35' is 10 mfd.
The capacity of capacitor 37 is 0.05 mfd.
The capacity of capacitor 45 is 5 mfd.

The capacities just stated are based on the assumption that the alternating current voltage supply to the transformer primary windings is 115 volts and the frequency is in the range of 50–60 cycles per second.

As mentioned hereinbefore, the resistor 12 and its associated adjustable contact 35 serve a reset rate control purpose. Thus, the rate at which the reset adjustments are accomplished may be increased with movement of the contact 35 toward the right end of resistor 12 and a reduction in the rate of reset may be effected by movement of the contact 35 toward the left end of that resistor. It is an important feature of the present invention that the reset rate may be varied over a very wide range as the contact 35 is moved from one end of the resistor to the other. In the particular embodiment disclosed, the reset rate may be so varied over a range of the order of one hundred to one.

The general manner in which adjustment of the contact 35 along the resistor 12 serves to change the reset rate will become apparent upon reference to the graphs shown in Figs. 7 through 10, considered in conjunction with the simplified diagram of Fig. 6. In each of Figs. 7 through 10, the abscissa represents time and the ordinate represents alternating voltage amplitude; the point of intersection of the abscissa with the ordinate representing zero voltage, the portion above the abscissa representing alternating voltage of one phase and the portion below alternating voltage of the opposite phase.

On the assumption that the apparatus has been stabilized for an appreciable period with the instrument contact D at the set-point and with the valve slidewire contact G in its mid position, the voltages $V_1$, $V_2$, $V_{3a}$, and $V_{2b}$ will all be equal to zero. A change in the position of the instrument slidewire contact D in response to a furnace temperature change will result in operation of the follow-up portion of the apparatus as required to effect a proportionate adjustment of the fuel valve E and of the valve slidewire contact G along the slidewire 2. The voltage produced as a result of such change in position of the contact G is designated in Fig. 6 as the voltage $V_2$ and has been designated in each of Figs. 7 through 10 by the same reference character.

Figure 7:
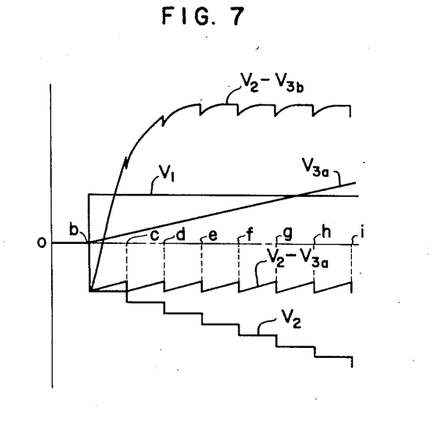
Figs. 7–10 are graphs illustrating in a general manner the operation of the apparatus.
Figure 8:
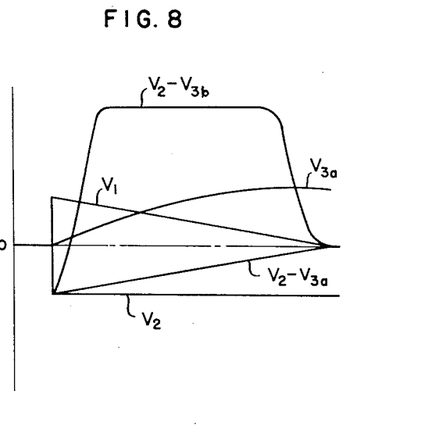
Figure 9:
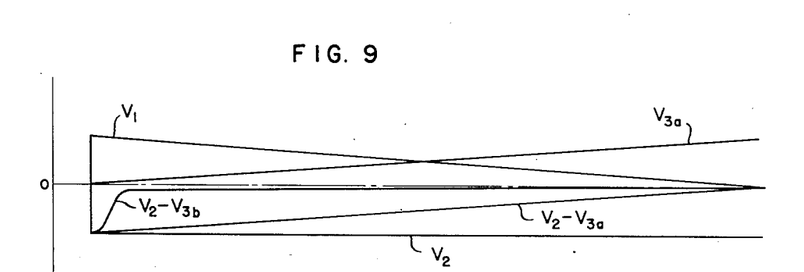
Figure 10:
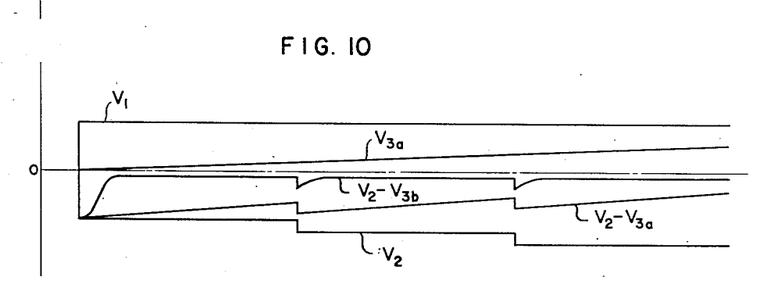

Figs. 7 and 8 illustrate the apparatus operation obtained with the contact 35 in its maximum reset rate position along the resistor 12, while Figs. 9 and 10 illustrate the operation obtained with the contact 35 in its minimum reset rate position. In Fig. 7, the voltage $V_2$ has a zero value between the points o—b along the time axis. At the time b, the magnitude of the voltage $V_2$ is shown to increase in the downward direction. This increase in magnitude is that produced by the follow-up adjustment of the contact G along the valve slidewire 2 in response to an increase in furnace temperature and resulting upward displacement of the instrument slidewire contact D from the set-point, which displacement produces the voltage $V_1$ of Fig. 6, represented in Fig. 7 by the curve $V_1$.

Under this condition of operation, the voltage input to the reset amplifier L consists of the algebraic sum of the voltages $V_2$ and $V_{3a}$. The algebraic sum of those voltages is graphically represented in Fig. 7 by the curve $V_2$—$V_{3a}$. That input voltage is effective to produce maximum current flow selectively in one or the other of the two output circuits of the reset amplifier L in accordance with the phase of said input voltage. For the specific case under consideration, namely that involving a furnace temperature increase, the output current of the reset amplifier L will flow through the circuit including the triode $L^3$ and the heater element m'. Maximum current will then flow through the heater element m' and the rate of heat supply to the thermally sensitive resistors 9 and 11 will be at a maximum value and the temperature of resistor 9 will rapidly increase to a maximum value. As a result, the voltage $V_{3b}$ produced by the reset bridge M will increase rapidly to a large value. The voltage $V_{3b}$ is that existing between the conductor 2a and the left end of resistor 12. This rapid increase in the voltage $V_{3b}$ is apparent from inspection of the curve $V_2$—$V_{3b}$ in Fig. 7. Since the reset contact 35 is adjusted to its extreme right end position along resistor 12, however, the voltage $V_{3b}$ is not effective to control the energization of the input circuit of the reset amplifier L and that input circuit is controlled solely in accordance with the algebraic sum of the voltages $V_2$ and $V_{3a}$, the voltage $V_{3a}$ being the voltage between the conductors 2a and 7.

The general manner in which the voltage $V_{3a}$ varies with respect to time, for the case under consideration, is designated in Fig. 7 by the curve having the same reference character. The value of the voltage $V_{3a}$ is initially zero, and increases in magnitude from the point b, at which point was effected the adjustment of the valve slidewire contact G and the resulting energization of the heater element $m'$, as explained above. The slope of the curve $V_{3a}$, and therefore, its rate of change, are at a maximum value because the temperature gradient between the thermally sensitive resistors 9 and 11 is a maximum value. This maximum temperature gradient is obtained because the heating element $m'$ is then operating to provide its maximum heat output.

As the voltage $V_{3a}$ gradually increases in magnitude, the effect on the follow-up amplifier J of the follow-up adjustment given the valve slidewire contact G is gradually diminished. That is to say, the algebraic sum of the voltages $V_2$ and $V_{3a}$ becomes less than that value required to offset the effect of the voltage $V_1$ on the input circuit of the amplifier J. In consequence, the amplifier J operates to energize the reversible motor F to produce a further adjustment of the valve E and of the valve slidewire contact G in the direction of its initial adjustment. That adjustment of the contact G produces an increase in the magnitude of the voltage $V_2$ in an amount just sufficient to offset the change in magnitude of the voltage $V_{3a}$.

The voltage $V_{3a}$ continues gradually to change in value because of the continued heating of the thermally sensitive resistors 9 and 11 by the heating element $m'$, and therefore, the algebraic sum of the voltages $V_2$—$V_{3a}$ will again become less than that value required to offset the effect of the voltage $V_1$ on the amplifier J. This causes a further change in the value of the voltage $V_2$ and a corresponding additional fuel valve adjustment. Such further adjustments of the voltage $V_2$ and of the fuel valve are produced in discrete steps as shown at the time points $c$—$i$ in Fig. 7 and are repeated as long as the instrument slidewire contact D is displaced from the set-point and the voltage $V_1$ has some finite value, or until the valve E has reached its limit of travel. In Fig. 7, the voltage $V_1$ is shown as having a constant finite value and, therefore, the reset action or discrete additional movements given to the valve E and to the valve slidewire contact G will continue until the valve E has been adjusted to an extreme position, specifically to its closed position for the condition of operation considered.

The graph shown in Fig. 8 illustrates the operation of the apparatus when the initial follow-up, closing adjustment given to the valve E (upon an increase in the furnace temperature and resulting upward displacement of the instrument slidewire contact D from its set-point) is just sufficient to restore the furnace temperature to its set-point value and the instrument slidewire contact D to its set-point position. Thus, in Fig. 8, the follow-up valve adjustment is effective to cause the effect of the voltage $V_1$ on the follow-up amplifier J to diminish gradually to zero at the same rate as the effect on the amplifier J of the voltage $V_2$—$V_{3a}$ is gradually diminished to zero. No further operation of the reversible motor F and adjustment of the fuel valve E are then produced nor required until such time as the furnace temperature may again deviate from its set-point.

The graph shown in Fig. 9 illustrates the operation obtained with the reset contact 35 adjusted to its extreme left end position along resistor 12 to provide the slowest rate of reset. Fig. 9, similarly to Fig. 8, illustrates the operation obtained when the initial follow-up adjustment given to the valve E and to the valve slidewire contact G is just sufficient to return the instrument pen to its set-point position and, hence, to reduce the voltage $V_1$ to zero. It should be noted that with the reset contact 35 adjusted to provide its slowest rate of reset, the voltage effective to control the reset amplifier L is the algebraic sum of the voltages $V_2$ and $V_{3b}$ and not the algebraic sum of the voltages $V_2$ and $V_{3a}$ as is the case when the reset contact 35 is in its right end position providing the fastest rate of reset. The general manner in which the algebraic sum of the voltages $V_2$ and $V_{3b}$ changes with respect to time upon departure of the instrument pen from the set-point is illustrated in Fig. 9 by the curve $V_2$—$V_{3b}$. The magnitude of this curve, except for a relatively short initial period, is considerably smaller than the magnitude of the corresponding curve $V_2$—$V_{3a}$, in Fig. 8. As a result, the energizing signal in the input circuit of the reset amplifier L is correspondingly small.

Because of the small energizing signal on the input circuit of the reset amplifier L, a relatively small current flows in the output circuit thereof, which output circuit for the case considered includes the heater element $m'$. Accordingly, the heat supplied by element $m'$ to the thermally sensitive resistors 9 and 11 and the temperature gradient between those resistors is correspondingly small. Since the temperature gradient existing between the thermally sensitive resistors 9 and 11 is small, the voltage $V_{3a}$ builds up at an appreciably slower rate than it does with the reset contact in its extreme right end or fast reset position. This slower rate in increase of voltage $V_{3a}$ causes the reset adjustments of the valve E and of the valve slidewire contact G to be accomplished at a correspondingly slower rate.

The slow rate at which the voltage $V_{3a}$ increases with the contact 35 in its left end position is illustrated in Fig. 9 which shows also the resulting slow rate at which the algebraic sum of the voltages $V_2$ and $V_{3a}$ diminishes to zero. For the condition of operation considered in Fig. 9, the rate at which the algebraic sum of the voltages $V_2$ and $V_{3a}$ diminishes is that required to offset the effect on the follow-up amplifier J of the similarly diminishing voltage $V_1$. Therefore, no further fuel valve adjustments are produced or required.

As those skilled in the art will understand, gradual variation in the magnitude of the temperature gradient between the thermally sensitive resistors 9 and 11, and, therefore, in the rate of increase of the voltage $V_{3a}$ may be accomplished by adjustment of the reset contact 35 along the resistor 12. Thus, fast, slow or any intermediate rates of reset may be selected at will by suitable adjustment of reset contact 35. As above noted, a variation in the reset rate of the order of one hundred to one, or even higher, may be obtained.

In Fig. 10, as in Fig. 9, the condition of operation contemplated is that obtained with the reset contact 35 in its extreme left end or slowest rate of reset position. The graph of Fig. 10 differs from that of Fig. 9 in that the voltage $V_1$ is shown as having a constant value indicating a continued and constant displacement of the instrument slidewire contact D from the set-point. It will be noted that the primary difference in the operation illustrated in Fig. 10 from that illustrated in Fig. 7 resides in the duration of the time intervals between successive valve reset adjustments. The increase in the time intervals between the valve adjustments shown in Fig. 10 is obtained because the algebraic sum of the voltages $V_2$ and $V_{3b}$ is small and produces a small flow of energizing current to the heater element $m'$, and, therefore, creates a correspondingly small temperature gradient between the thermally sensitive resistors 9 and 11. Such small temperature gradient, as previously explained, is effective to cause the rate of increase of the voltage $V_{3a}$ to be slow.

As those skilled in the art will understand, the required adjustment of the reset contact 35 along the sildewire resistor 12 is determined by the operating characteristics of the furnace or the other variable condition under control. Thus, with a suitable adjustment of the reset contact 35, the controlled variable will be restored to its desired set-point in a minimum time with no hunting or cycling about the set-point.

The explanation of the apparatus operation made by reference to Figs. 7–10 contemplates a furnace temperature increase from the set-point involving energization of the heater element $m'$ and heating of the thermally sensitive resistors 9 and 11. In this connection, it is noted that with zero signal on the input circuit of the reset amplifier L, the energizing current flows in each of the heater elements $m$ and $m'$ are small finite values, although the reset amplifier may be adjusted to provide zero current flow in each of the heater elements $m$ and $m'$ for this condition of operation, if desired. Thus, upon a decrease in furnace temperature from the set-point, the energizing current flow to the heater element $m'$ will be substantially reduced or cut off entirely while the energizing current flow in the heater element $m$ will be increased. For this furnace operating condition, the phase of the alternating input voltage to the reset amplifier L is such as to render the triode valve $L^3$ non-conductive and to increase the conductivity of the valve $L^4$. This results in an increase in the energizing flow of current to the heater element $m$, and in heat flow to the thermally sensitive resistors 8 and 10. The heating of the resistors 8 and 10 establishes a temperature gradient between them the magnitude of which is dependent upon the magnitude of energizing current flow through heating element $m$, and hence, upon the adjustment of reset contact 35 along the resistor 12. The heating of the resistors 8 and 10 therefore produces voltages $V_{3a}$ and $V_{3b}$ as in the case of a furnace temperature increase, but the heating of the thermally sensitive resistors 8 and 10 now causes the phase of the voltages $V_{3a}$ and $V_{3b}$ to be opposite to that existing when the thermally sensitive resistors 9 and 11 are heated. This opposite phase relationship is desired because upon downward displacement of the position of the instrument slidewire contact D resulting from a reduction in the furnace temperature from the set-point, the voltage $V_1$ obtained is also of opposite phase.

As will become apparent upon careful analysis of the construction and operation of the reset bridge M, the reset bridge voltages $V_{3a}$ and $V_{3b}$ are varied not only in response to an increase in the flow of energizing current through one or the other of the heater elements $m$ and $m'$, but also in accordance with the cooling action which occurs upon deenergization of one or the other of those heater elements. Thus, on the assumption that the furnace temperature departure has been in the direction to effect energization of the heater element $m'$ and has persisted for a time interval long enough to have established an appreciable temperature gradient between the thermally sensitive resistors 9 and 11, a subsequent and relatively rapid departure of the instrument slidewire contact D in the opposite direction will effect a rapid reduction in the energizing current flow through the heater element $m'$ and an increase in the energizing current flow through the heater element $m$. The voltage then established between the conductors $2a$ and 7, which voltage corresponds to the voltage $V_{3a}$ in Fig. 6, will then have a magnitude determined by the rate at which the thermally sensitive resistors 9 and 11 are cooling as well as the rate at which the thermally sensitive resistors 8 and 10 are heating. The precise effect of this cooling action, quantitatively and qualitatively speaking, upon the overall performance and operation of the control apparatus is not now fully understood, but it is believed to contribute substantially to stability of operation.

A further feature of the control apparatus arrangement herein disclosed resides in the inherent temperature regulation obtained with the reset bridge M. This regulation renders the thermally sensitive elements of the reset bridge M substantially immune from variations in ambient temperature to which those resistors may be subjected. That is to say, the energizing current flow to each of the heater elements $m$ and $m'$ is determined substantially solely in accordance with the resetting demands of the furnace temperature or other processes under control. Thus, the temperature sensitive resistors 8 and 9 comprise temperature sensitive elements which vary the energizing current flow through their respectively associated heater elements $m$ and $m'$ as required to produce the needed operating voltages between the conductors $2a$ and 7 and between the conductors $2a$ and 36. Ambient temperature variations have substantially no effect in determining the magnitudes of the energizing currents through the heater elements $m$ and $m'$ required to produce said voltages.

In a practical operating embodiment of the invention, the metallic can containing the thermally sensitive elements 8 and 10 is arranged in a box which also contains the metallic can housing the thermally sensitive elements 9 and 11. Suitable insulating material such as glass wool may be placed around each of the cans to thermally isolate them from each other as well as from the surrounding ambient conditions.

It is noted that with the control apparatus herein disclosed, if the furnace A is manually shut down for short periods by the closing of additional fuel supply valve means not shown, as, for example, in a periodic process, the cooling of the furnace will produce a downward adjustment of the instrument slidewire contact D, and if the control networks H, I, J, L, and M are maintained energized during the periods of shutdown, a follow-up adjustment of the valve slidewire contact in the upward or valve opening diretcion will be effected. Thereafter, the heater element $m$ will be energized by the reset amplifier L to gradually build a temperature gradient between the thermally sensitive resistors 8 and 10 and thereby establish a corresponding gradual increase in the voltage existing between the conductors $2a$ and 7 of Fig. 1, which corresponds to the voltage $V_{3a}$ in Fig. 6. As explained above, the change in this voltage is effective to produce a further upward adjustment of the valve slidewire contact G, if the fuel valve E is not already in its extreme open position. The said voltage $V_{3a}$ will continue to build up even after the valve slidewire contact G has reached its extreme upper position and specifically will continue to increase until the algebraic sum of said voltage and of the valve slidewire voltage $V_2$ is equal to zero.

If the time of furnace shutdown is short and the rate of furnace temperature rise is suitably fast, the change in magnitude of the voltage $V_{3a}$ will not be significant and, therefore, no significant further upward adjustment of the valve slidewire contact G and opening adjustment of the valve E will be made. When the time of shutdown is appreciable or the rate of furnace temperature rise is slow, however, the change in the magnitude of voltage $V_{3a}$ will be relatively large and the voltage $V_{3a}$ may assume a value equal and opposite to the voltage $V_2$. Moreover, even if the circuit networks are deenergized while the furnace is shut down, if the rate of furnace temperature rise is very slow, the voltage $V_{3a}$ may build up to a value equal and opposite to the voltage $V_2$.

In either of the cases above mentioned, the effect of such a large change in the voltage $V_{3a}$ is to delay the follow-up adjustment of the valve slidewire contact G in a downward direction, as the furnace temperature begins to rise, and thereby the closing adjustment of the fuel valve E, until the instrument slidewire contact D has reached its set-point position. Consequently, although the furnace temperature is rising, the control apparatus will be insensitive to that rise until the instrument slidewire contact D has reached and passed its set-point. The effect of such insensitivity of the control apparatus is to permit the supply of more fuel to the furnace than is needed to bring the furnace temperature to the desired value and, hence, to produce undesirable cycling or hunting.

For the purpose of avoiding such an undesirable condition of operation, there is provided in the reset amplifier L shown in Fig. 1, the adjustable resistor 47 which serves to limit the maximum reset obtainable with the apparatus under a particular operating condition. The adjustable resistor 47 is connected in the cathode circuit of the triode valve $L^4$ and, therefore, reduces or limits the current flow in the output circuit of that valve, which output circuit includes the heater element $m$. As noted, the heater element $m$ is thermally associated with the temperature sensitive resistors 8 and 10 and serves in conjunction with those temperature sensitive resistors to effect the resetting adjustments of the fuel valve E in the opening direction. By reducing the maximum value of energizing current permited to flow through the heater element $m$, the adjustable resistor 47 effects a reduction in the maximum rate at which the opening resetting adjustments may be accomplished.

No resistor corresponding to the resistor 47 is connected in the output circuit of the valve triode $L^3$, and, therefore, the maximum rate of energizing current flow through the heater element $m'$ is greater than that through the heater element $m$. As a result, the maximum permissible rate of reset in the valve closing direction is greater than the maximum permissible reset rate in the valve opening direction. The difference in those rates of reset adjustments may be varied, as desired, by adjustment of the magnitude of the resistor 47, which, as noted hereinbefore, may have a maximum resistance of 20,000 ohms. By suitably relating the adjustment of resistor 47 to the characteristics of the furnace or other device or process under control, the operation of the control apparatus may be so correlated with respect to the said characteristics as required to permit the rise in furnace temperature to the set-point to be desirably rapid while minimizing the tendency of the control apparatus to produce cycling or hunting action.

While the thermally sensitive resistors 8—11 in the disclosed embodiment of the invention have been described as being of the type having a negative temperature coefficient of resistance, it will be understood that thermally sensitive resistors having a positive coefficient of resistance may also be utilized if desired, with no other change in the circuit required except suitable phasing of the voltages between the conductors $2a$ and 7 and the conductors $2a$ and 36 in relation to the voltage between the instrument slidewire contact D and ground and the voltage between the valve slidewire contact G and ground.

It will be understood also that the present invention is not restricted in its operation to the use of thermally sensitive resistors in the reset bridge M, but that other thermally sensitive devices such, for example, as temperature sensitive capacitors, may be utilized in association with suitable phase shifting devices in circuit with the conductors 2a, 7 and 36 to provide the desired resetting adjustment with substantially no other change in the disclosed apparatus.

Subject matter disclosed but not claimed herein is being disclosed and claimed in my copending divisional application bearing Serial No. 393,680, which was filed on November 23, 1953.

While, in accordance with the provisions of the statutes, I have illustrated and described a preferred embodiment of the present invention, those skilled in the art will understand that changes may be made in the form of the apparatus disclosed without departing from the spirit of my invention as set forth in the appended claims, and that some features of the present invention may sometimes be used with advantage, without a corresponding use of other features.

Having now described my invention, what I claim as new and desire to secure by Letters Patent, is:

1. In electrical apparatus comprising means to create an alternating voltage signal which varies in phase and magnitude with the direction and extent of the difference between the actual and a predetermined normal value of a variable condition, a regulator adapted to be adjusted to different positions for regulating the value of said condition, and means to produce a follow-up voltage signal varying in a predetermined manner with the changes in position of said regulator, the improvement comprising a reset bridge circuit having three parallel connected branches, a first one of said branches including a first pair of serially connected bridge arm resistors of substantial temperature coefficient of resistance joined at a first junction, a second one of said branches including a second pair of serially connected bridge arm resistors of substantial temperature coefficient of resistance joined at a second junction, the third one of said branches having an intermediate junction, means adapted to energize said three branches in parallel, a slidewire resistor connected between said first and second junctions, a separate heating device for heating each of the two of said resistors which are connected in corresponding positions in their respective branches, a reset amplifier having an input circuit and having an output circuit, circuit means connecting in series in said input circuit said follow-up signal and a voltage signal developed between said intermediate junction and an adjustable point along said slidewire resistor, circuit means connecting said output circuit to said heating devices to selectively energize said heating devices in accordance with the phase of the resultant signal impressed on said input circuit, and circuit means including in series said follow-up signal and a voltage developed between said intermediate junction and said first junction and adapted to control said regulator.

2. An improvement as specified in claim 1 in which each of the heating devices is adapted to dissimilarly heat the two resistors of the pair of resistors heated by that device.

3. An improvement as specified in claim 1 in which each of the heating devices is adapted to heat at different rates the two resistors of the pair of resistors heated by said device.

4. An improvement as specified in claim 1 in which each heating device and the two bridge arm resistors which it heats are combined in a unit comprising a metallic container enclosing the two resistors of the unit, heat insulation material separating the two resistors, and a heat storing mass of metal in good heat conductive relation with one of said resistors and separated from the other resistor by heat insulation material so that said resistors are heated at different rates, and in which said device is external to said container.

5. An improvement as specified in claim 1 in which each heating device and the two bridge arm resistors which it heats are combined in a unit comprising a metallic container enclosing the two resistors of the unit, heat insulation material separating the two resistors, and a heat storing mass of metal of good heat conductivity in good heat transfer relation with one of said resistors and in poor heat transfer relation with the other resistor, said heating device being external to said container and increasing the temperature of the resistor in good heat transfer relation with said mass more slowly than it increases the temperature of the other resistor.

6. An improvement as specified in claim 1 in which the two bridge arm resistors heated by the same heating device are enclosed in a separate container along with heat insulation material arranged to make the rate of heat transfer from the container to one of said resistors greater than to the other resistor, and in which the device for heating said resistors is a wire coiled about said container.

7. Electrical apparatus for effecting proportional control with automatic reset action, comprising a circuit network having energizing connections for connection to a source of alternating current and having first, second, and third output terminals, and including conductive elements decreasing in resistance as their temperatures are increased, measuring means for adjusting said network on the occurrence of a difference between the actual value and a predetermined normal value of a controlled variable and thereby developing in a portion of said network conductively connected directly to the first output terminal a primary voltage signal which varies in phase and magnitude with the direction and extent of said difference, a regulator adjustable to effect corrective actions tending to reduce said difference and operating on each adjustment to effect a corresponding adjustment of said network and thereby develop in a portion of said network conductively connected to said second output terminal by said elements a follow-up voltage signal which is of a phase and magnitude dependent on the direction and extent of the regulator adjustment, heating resistors operative to selectively heat different elements at different rates and thereby develop in said elements a reset voltage signal opposite in phase to said follow-up voltage signal and progressively increasing in magnitude as the resistances of said elements diminish, whereby the resultant of said follow-up and reset signals is impressed on said second output terminal, conductive connections of different resistivity connecting the said elements heated at different rates to said third output terminal, whereby current flow through said elements develops a second reset voltage signal impressed on said third output terminal, an electronic reset amplifier having an input circuit to which said third terminal is connected and having an output circuit including said heating resistors whereby the latter are selectively heated in accordance with said second reset signal, and a follow-up amplifier having an input circuit to which said first and second output terminals are connected and having an output circuit including means actuated by the current flow in the last mentioned circuit to adjust said regulator in accordance with the resultant of said primary, follow-up and first reset voltage signals, thereby to reduce said difference and said primary voltage signal.

8. Electrical apparatus for effecting proportional control with automatic reset action, comprising a follow-up bridge circuit having energizing connections for connecting said circuit to a source of alternating current and including measuring and follow-up slidewires, a slider contact and means for adjusting said contact along said measuring slidewire in accordance with the difference between the actual value and a predetermined normal value of a controlled variable, and thereby developing a primary alternating voltage signal dependent in phase and magnitude on the direction and extent of said difference, a regulator adjustable to effect control actions tending to minimize said difference, a slider contact adjustable along said follow-up slidewire to create a second alternating current voltage signal opposite in phase to the first mentioned voltage signal and varying in magnitude with variations in the adjustment position of the regulator, first and second output terminals respectively connected to the slider contacts respectively engaging the measuring and follow-up slidewires, a reset circuit comprising a Wheatstone bridge having a separate temperature responsive resistor in each of the four arms of the bridge, energizing connections for connecting opposing junctions of said Wheatstone bridge to said source of alternating current, a potentiometer resistor connecting the second pair of opposed junctions of said bridge, a third output terminal connected to one of the last mentioned junctions, said second output terminal being connected to said third output terminal through said energizing connections, whereby there is impressed on said third output terminal the resultant of said second voltage signal and a third alternating voltage signal opposite in phase to said second signal and developed in said bridge by variations in the currents flowing through the different bridge arm resistors, a fourth output terminal connected to said potentiometer resistor at a point intermediate the ends of the latter, a separate electrical heating element for heating each of the two pairs of bridge arms connected to the energizing connections, a reset amplifier having an input circuit connected to said fourth output terminal and having an output circuit selectively energizing said heating elements thereby to increase or decrease the resistances of one of the pairs of bridge arm resistors connected to the energizing connections relative to the other of said voltage pairs of resistors accordingly as said second voltage signal is of one phase or the opposite phase, a follow-up amplifier having an input circuit connected to said first and third output terminals and having an output circuit, and a motor controlled through the last mentioned output circuit for effecting corrective adjustments of said regulator and proportional adjustments of the slider contact engaging said follow-up slidewire, and thereby substantially eliminating said first voltage signal.

9. Electrical apparatus for effecting proportional control with automatic reset action comprising means to create an alternating voltage signal which varies in phase and magnitude with the direction and extent of the difference between the actual value and a predetermined normal value of a variable condition, a regulator adapted to be adjusted to different positions for regulating the value of said condition, means to produce a follow-up voltage varying in a predetermined manner with the changes in position of said regulator, reset mechanism actuated by said follow-up voltage to produce an alternating reset voltage progressively increasing in magnitude while said difference exists, and regulator actuating means including a phase sensitive relay means having an output circuit connected to said regulator, having an input circuit, and responsive to the phase of voltage signals applied to said input circuit, said regulator actuating means also including a network having three parallel connected branches, one of said branches including the input circuit of said phase sensitive relay means, whereby said phase sensitive relay means is operative to control said regulator for adjustment in one direction or the other accordingly as an alternating voltage signal of one phase or of the opposite phase is impressed on said one branch, another of said branches including said means to create said voltage signal, and the third of said branches including said means to produce said follow-up voltage connected in series with said reset mechanism producing said reset voltage, with the reset voltage connected to oppose said follow-up voltage.

10. A combination as specified in claim 9, wherein said reset mechanism comprises a bridge circuit having three parallel connected arms, a first one of said arms including a first pair of serially connected bridge arm resistors of substantial temperature coefficient of resistance joined at a first junction, a second one of said arms including a second pair of serially connected bridge arm resistors of substantial temperature coefficient of resistance joined at a second junction, the third one of said arms having an intermediate junction, means adapted to energize said three arms in parallel, a slidewire resistor connected between said first and second junctions, a separate heating device for heating each of the two of said resistors which are connected in corresponding positions in their respective bridge arms, a reset amplifier having an input circuit and an output circuit, circuit means connecting in series in the last mentioned input circuit said follow-up voltage and a voltage developed between said intermediate junction and an adjustable point along said slidewire resistor, and circuit means connecting the last mentioned output circuit to said heating devices to selectively energize said heating devices in accordance with the resultant signal impressed on said last mentioned input circuit, and wherein the reset voltage produced by said reset mechanism in the third of said branches is developed between said intermediate junction and said first junction.

11. A combination as specified in claim 10, wherein said reset amplifier includes a separate output circuit associated with each of said heating devices, and wherein means are provided in at least one of the last mentioned output circuits for dissimilarly energizing said heating devices thereby to effect automatic reset action at different rates depending upon the direction of the deviation of the variable condition from the predetermined normal value thereof.

12. A combination as specified in claim 10, wherein said adjustable point along said slidewire resistor consists of a sliding contact in engagement therewith, and wherein means are provided to adjust said sliding contact along said slidewire resistor for adjusting the rate at which automatic reset action is effected.

13. Electrical apparatus for effecting proportional control with automatic reset action comprising adjustable means to create a voltage signal variable in polarity and magnitude with the direction and extent of the difference between the actual value and a predetermined normal value of a variable condition, a regulator adapted to be adjusted to different positions for regulating the value of said condition, means to produce a follow-up voltage varying in a predetermined manner with the changes in position of said regulator, reset mechanism actuated by said follow-up voltage to produce a reset voltage progressively increasing in magnitude while said difference exists, and regulator actuating means including relay means having an output circuit connected to said regulator, having an input circuit, and responsive to the polarity of voltage signals applied to said input circuit, said regulator actuating means also including a network having three parallel connected branches, one of said branches including the input circuit of said relay means, whereby said relay means is operative to control said regulator for adjustment in one direction or the other accordingly as a voltage signal of one polarity or of the opposite polarity is impressed on said one branch, another of said branches including said means to create said voltage signal, and the third of said branches including said means to produce said follow-up voltage connected in series with said reset mechanism producing said reset voltage, with the reset voltage connected to oppose said follow-up voltage.

14. Electrical apparatus for effecting proportional control with automatic reset action comprising means to create an alternating voltage signal which varies in phase and magnitude with the direction and extent of the difference between the actual value and a predetermined normal value of a variable condition, a regulator adapted to be adjusted to different positions for regulating the value of said condition, means to produce a follow-up voltage varying in a predetermined manner with the changes in position of said regulator, reset mechanism actuated by said follow-up voltage to produce an alternating reset voltage progressively increasing in magnitude while said difference exists, and regulator actuating means including a phase sensitive relay means having an output circuit connected to said regulator, having an input circuit, and responsive to the phase of voltage signals applied to said input circuit, said regulator actuating means also including a network having three parallel connected branches, one of said branches including the input circuit of said phase sensitive relay means, whereby said phase sensitive relay means is operative to control said regulator for adjustment in one direction or the other accordingly as an alternating voltage signal of one phase or of the opposite phase is impressed on said one branch, another of said branches including a first resistive element and said means to create said voltage signal, and the third of said branches including a second resistive element and said means to produce said follow-up voltage connected in series with said reset mechanism producing said reset voltage, with the reset voltage connected to oppose said follow-up voltage, the relative effects of said voltage signal and the algebraic sum of said follow-up and reset voltages in impressing a resultant alternating voltage on said one branch being determined by the relative magnitudes of said first and second resistive elements.

15. An improvement as specified in claim 14 wherein the resistance of at least one of said resistive elements is adjustable in magnitude to permit variation in the relative effects of said voltage signal and the algebraic sum of said follow-up and reset voltages in impressing a resultant alternating voltage on said one branch.

16. An improvement as specified in claim 14 wherein no adjustment of said regulator is produced when the algebraic sum of said signal voltage and the voltage drop across said first resistive element is equal and opposite to the algebraic sum of said follow-up and reset voltages and the voltage drop across said second resistive element whereby zero voltage is impressed on said one branch and the input circuit of said phase sensitive relay means.

17. Electrical apparatus for effecting proportional control with automatic reset action comprising means to create a voltage signal which varies in polarity and magnitude with the direction and extent of the difference between the actual value and a predetermined normal value of a variable condition, a regulator adapted to be adjusted to different positions for regulating the value of said condition, means to produce a follow-up voltage varying in a predetermined manner with the changes in position of said regulator, reset mechanism actuated by the follow-up voltage to produce a reset voltage progressively increasing in magnitude while said difference exists, and regulator actuating means including relay means having an output circuit connected to said regulator, having an input circuit and responsive to the polarity of voltage signals applied to said input circuit, said regulator actuating means also including a network having three parallel connnected branches, one of said branches including the input circuit of said relay means, whereby said relay means is operative to control said regulator for adjustment in one direction or the other accordingly as a voltage signal of one polarity or of the opposite polarity is impressed on said one branch, another of said branches including a first resistive element and said means to create said voltage signal, and the third of said branches including a second resistive element and said means to produce said follow-up voltage connected in series with said reset mechanism producing said reset voltage, with the reset voltage connected to oppose said follow-up voltage, the relative effects of said voltage signal and the algebraic sum of said follow-up and reset voltages in impressing a resultant voltage on said one branch being determined by the relative magnitudes of said first and second resistive elements.

18. An improvement as specified in claim 17 wherein the resistance of at least one of said resistive elements is adjustable in magnitude to permit variation in the relative effects of said voltage signal and the algebraic sum of said follow-up and reset voltages in impressing a resultant voltage on said one branch.

19. An improvement as specified in claim 17 wherein no adjustment of said regulator is produced when the algebraic sum of said signal voltage and the voltage drop across said first resistive element is equal and opposite to the algebraic sum of said follow-up and reset voltages and the voltage drop across said second resistive element whereby zero voltage is impressed on said one branch and the input circuit of said relay means.

20. Electrical apparatus for effecting proportional control with automatic reset action comprising adjustable means to create a voltage signal variable in polarity and magnitude with the direction and extent of the difference between the actual value and a predetermined normal value of a variable condition, a control element adapted to be adjusted to different positions for controlling the value of said condition, means to produce a follow-up voltage varying in a predetermined manner with the changes in position of said control element, reset mechanism actuated by the follow-up voltage to produce an alternating reset voltage progressively increasing in magnitude while said difference exists, a motor for adjusting said control element, and motor actuating means including relay means having an output circuit connected to said motor, having an input circuit, and responsive to the polarity of voltage signals applied to said input circuit, said motor actuating means also including a network having three parallel connected branches, one of said branches including the input circuit of said relay means, whereby said relay means is operative to control said motor for operation in one direction or the other accordingly as a voltage signal of one polarity or of the opposite polarity is impressed on said one branch, another of said branches including said means to create said voltage signal, and the third of said branches including said means to produce said follow-up voltage connected in series with said reset mechanism producing said reset voltage, with the reset voltage connected to oppose said follow-up voltage.

References Cited in the file of this patent

UNITED STATES PATENTS

| Number | Name | Date |
|---|---|---|
| 2,293,045 | Crowell | Aug. 18, 1942 |
| 2,325,308 | Davis | July 27, 1943 |
| 2,371,732 | Bristol | Mar. 20, 1945 |
| 2,390,793 | Jones | Dec. 11, 1945 |
| 2,463,805 | Polye et al. | Mar. 8, 1949 |
| 2,509,295 | Glass | May 30, 1950 |

FOREIGN PATENTS

| Number | Country | Date |
|---|---|---|
| 444,673 | Great Britain | Mar. 25, 1936 |